No. 771,842. PATENTED OCT. 11, 1904.
G. O. STANSBURY & E. Z. CUMMINS.
FRUIT PICKER.
APPLICATION FILED MAY 2, 1904.
NO MODEL.

Witnesses
F. R. Glow
H. C. Rodgers

Inventors:
E. Z. Cummins and G. O. Stansbury
By George J. Thorp
Atty.

No. 771,842. Patented October 11, 1904.

UNITED STATES PATENT OFFICE.

GARRETT ORVILLE STANSBURY AND EDWIN Z. CUMMINS, OF CHERRY-VALE, KANSAS.

FRUIT-PICKER.

SPECIFICATION forming part of Letters Patent No. 771,842, dated October 11, 1904.

Application filed May 2, 1904. Serial No. 205,954. (No model.)

*To all whom it may concern:*

Be it known that we, GARRETT ORVILLE STANSBURY and EDWIN Z. CUMMINS, citizens of the United States, residing at Cherryvale, in the county of Montgomery and State of Kansas, have invented certain new and useful Improvements in Fruit-Pickers, of which the following is a specification.

Our invention relates to fruit-pickers, and more especially to that type embodying a long handle by which the operator is enabled to pick the fruit from the trees while standing on the ground; and our object is to produce an efficient device of this character which is of light weight, so that it can be handled easily, and which is of simple, strong, durable, and cheap construction.

To this end the invention consists in certain novel and peculiar features of construction and combinations of parts, as hereinafter described and claimed, and in order that it may be fully understood reference is to be had to the accompanying drawings, in which—

Figure 1:
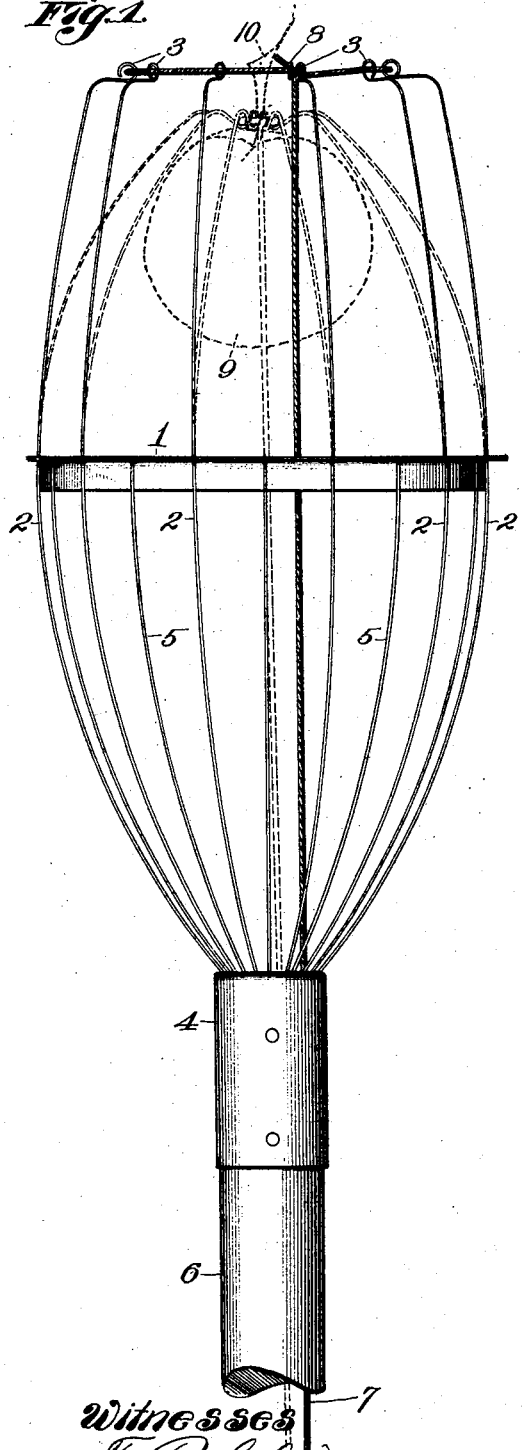
Figure 2:
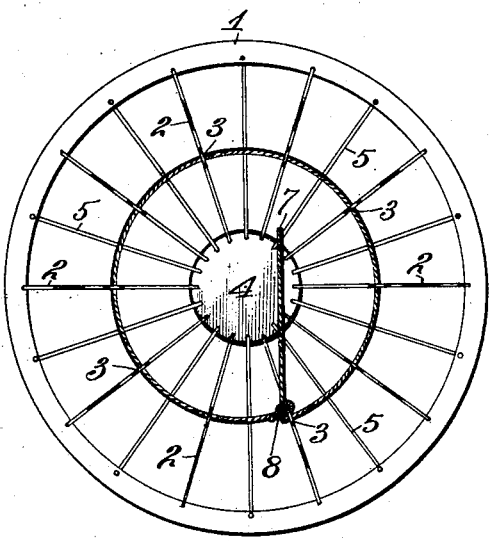
Figure 3:
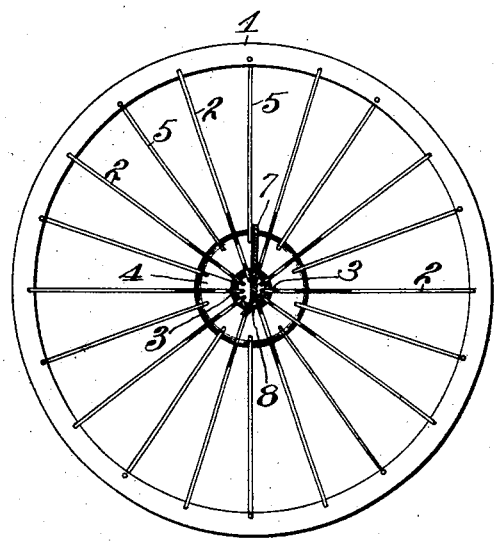

Figure 1 is a side elevation of a fruit-picker embodying our invention. Fig. 2 is a top plan view with the picker in position to be engaged with the fruit. Fig. 3 is a similar view with the mouth of the picker contracted preliminary to the picking operation.

Referring to the drawings in detail, a skeleton basket is constructed as follows: 1 is a circular ring of right-angle form in cross-section, and 2 a series of preferably equidistant spring-wires extending through the horizontal flange and at the outer side of the vertical side of the ring or said wires may be otherwise rigidly secured thereto. The upper ends of the wires terminate in loops 3, normally so disposed that between the series is formed the mouth of the basket, said mouth being large enough to receive apples, oranges, or other large fruit. The lower ends of the wires more nearly approach each other than their upper ends, by preference, and are secured rigidly in any suitable manner to the sleeve or socket 4, and in order that the basket shall hold small fruit—such as cherries, damsons, &c.—we employ additional wires 5, secured to the ring at their upper ends and to the sleeve or socket at their lower ends in any suitable manner, or the interstices between the lower ends of wires 2 may be otherwise reduced to accommodate the smaller fruit. The basket as described comprises a substantially rigid lower portion and a spring or contractible upper portion and is preferably at the upper end of a long handle 6, the latter being reliably secured in the socket or sleeve 4 in any suitable manner. For the purpose of contracting the mouth of the basket a cord 7 or its equivalent extends along the handle for approximately its full length up through the basket within the ring, by preference, through all of the loops 3, and the upper end of the cord is knotted or otherwise secured, as at 9, to the loop from which the cord depends.

To pick the fruit with this device—for instance, an apple, as indicated by dotted lines, as at 9—the basket is raised until the apple is inclosed by the upper portion of the basket and the mouth of the latter is in the plane of the apple-stem 10. The cord 7 is then pulled downward so that by sliding in the loops 3, and thereby contracting the looped end of the cord, the mouth of the basket will be contracted until its loops 3 encircle the stem of the apple, as indicated by dotted lines, Fig. 1, the position of the loops 3 with the mouth contracted being also shown in full lines, Fig. 3. The operator now holding the cord tightly pulls upon the handle and picks the fruit, the latter dropping into the basket, and as the latter is of size to hold not to exceed a dozen apples, by preference, there is no danger of the fruit being bruised by the fall. Furthermore, the operator with a little experience can pick the fruit in such a manner that its fall will be cushioned.

From the above description it will be apparent that while we have illustrated and described the preferred construction of the picker it is susceptible of modification in various particulars without departing from the principle of construction involved or sacrificing any of its advantages.

Having thus described the invention, what we claim as new, and desire to secure by Letters Patent, is—

1. A fruit-picker, comprising a handle; a socket thereon; a basket consisting of alternately-arranged short and long spring-wires secured at their lower ends to the socket, and a ring secured to the upper ends of the short wires and to the long wires near their middle; and a cord slidingly secured to the upper ends of all of the long wires and tightly secured at one end to one of them, substantially as shown and described.

2. A fruit-picker, comprising a handle; a socket thereon; a basket consisting of short wires secured at their lower ends to the socket, an angle-ring secured to the upper ends of said wires, and long wires arranged alternately with the short ones and extending through holes in the angle-ring and secured at their lower ends to the socket and having their upper ends bent radially inward at right angles substantially to the handle and terminating in loops 3; and a cord extending through said loops and secured tightly to the upper end of one of said long wires, substantially as shown and described.

In testimony whereof we affix our signatures in the presence of witnesses.

GARRETT ORVILLE STANSBURY.
EDWIN Z. CUMMINS.

Witnesses:
E. S. McDONALD,
DAVID FOYLEMAN,
WILLIAM C. LOGAN.